(12) United States Patent
Creek et al.

(10) Patent No.: US 8,430,778 B2
(45) Date of Patent: Apr. 30, 2013

(54) INTEGRATED GEAR CONSTANT VELOCITY JOINT FOR ALL WHEEL DRIVE

(75) Inventors: Steven W. Creek, Shelby Township, MI (US); Edralin S Diaz, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 241 days.

(21) Appl. No.: 13/080,550

(22) Filed: Apr. 5, 2011

(65) Prior Publication Data

US 2012/0258836 A1 Oct. 11, 2012

(51) Int. Cl.
*F16H 13/08* (2006.01)
(52) U.S. Cl.
USPC .......................................................... 475/196
(58) Field of Classification Search .................. 475/196, 475/197
See application file for complete search history.

(56) References Cited

U.S. PATENT DOCUMENTS

| | | | | |
|---|---|---|---|---|
| 3,227,005 A | * | 1/1966 | Johnson | 475/196 |
| 5,989,145 A | * | 11/1999 | Bursal et al. | 475/196 |
| 2003/0069105 A1 | * | 4/2003 | Ohta | 475/184 |

* cited by examiner

*Primary Examiner* — Edwin A Young

(57) ABSTRACT

A drive arrangement connects a drive gear of a vehicle transmission/transfer to a prop shaft that drives a set of wheels, and includes a driven gear journaled for rotation on a housing and having teeth meshing with teeth provided on the drive gear. The driven gear has an axially extending cylindrical central bore. A yoke attached to the prop shaft has a shaft extending into the central bore of the driven gear. An annular inner race has a central bore encircling the yoke and an outer surface. Matching splines provided on the central bore of the inner race and the yoke couple the inner race and the yoke for rotation. A plurality of balls are located between the outer surface of the inner race and the central bore of the driven gear, each of the balls is seated within a longitudinally extending first groove provided on the outer surface of the inner race and a longitudinally extending second groove provided on the central bore of the driven gear. The balls transmit rotary torque between the driven gear and the inner race and roll axially within the first and second grooves to permit movement of the yoke within the central bore during high speed rotation of the driven gear and prop shaft.

12 Claims, 2 Drawing Sheets

INTEGRATED GEAR CONSTANT VELOCITY JOINT FOR ALL WHEEL DRIVE

The present invention relates to all wheel drive systems for motor vehicles and more particularly a constant velocity prop shaft joint integrated into a gear.

BACKGROUND OF THE INVENTION

It is known to connect rotating parts via a constant velocity joint that will accommodate misalignment or motion of the one rotating part relative the other. Such constant velocity joints typically include an inner race that is attached to one of the rotating members and an outer race that is attached to the other of the rotating members.

It would be desirable to provide a constant velocity propeller shaft joint in an all-wheel-drive system that would integrate the outer race into a gear to thereby obtain economies of manufacturing and improved performance.

SUMMARY OF THE INVENTION

A drive arrangement connects a drive gear of a vehicle transmission/transfer to a prop shaft that drives a set of wheels, and includes a driven gear journaled for rotation on a housing and having teeth meshing with teeth provided on the drive gear. The driven gear has an axially extending cylindrical central bore. A yoke attached to the prop shaft has a shaft extending into the central bore of the driven gear. An annular inner race has a central bore encircling the yoke and an outer surface. Matching splines provided on the central bore of the inner race and the yoke couple the inner race and the yoke for rotation. A plurality of balls are located between the outer surface of the inner race and the central bore of the driven gear, each of the balls is seated within a longitudinally extending first groove provided on the outer surface of the inner race and a longitudinally extending second groove provided on the central bore of the driven gear. The balls transmit rotary torque between the driven gear and the inner race and roll axially within the first and second grooves to permit movement of the yoke within the central bore during high speed rotation of the driven gear and prop shaft.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
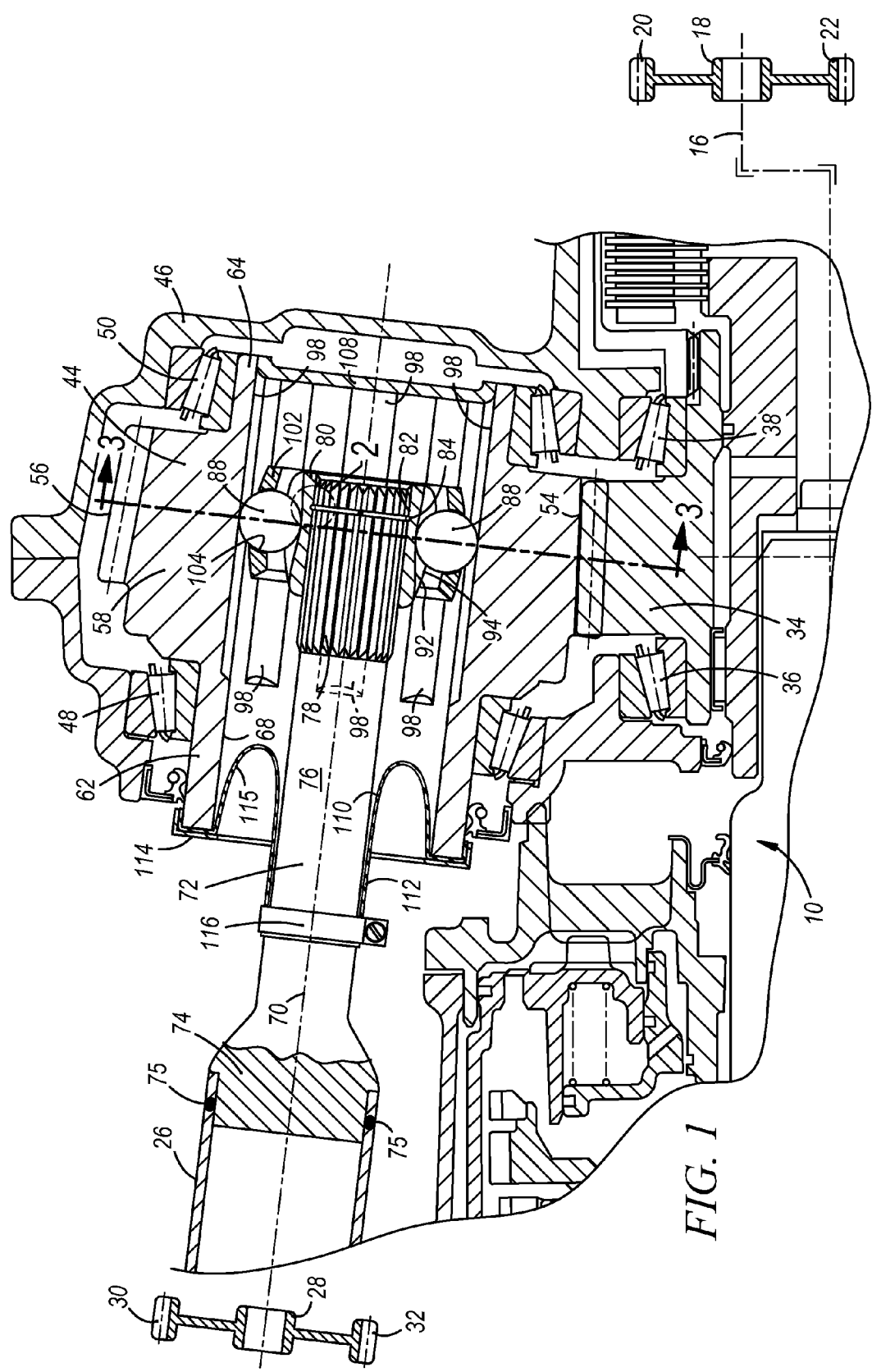
FIG. 1 is a plan view showing a vehicle transmission/transfer unit connected to a propeller shaft by constant velocity joint.

Referring to FIG. 1, an all-wheel-drive system is provided for a motor vehicle. A vehicle transmission/transfer unit, indicated generally at 10, is driven by a vehicle engine, not shown. A driveshaft 16 extends from the transmission/transfer unit 10 to a rear differential 18 that drives rear wheels 20 and 22. A propeller or prop shaft 26 extends to a front differential 28 that drives front wheels 30 and 32.

Figure 3:
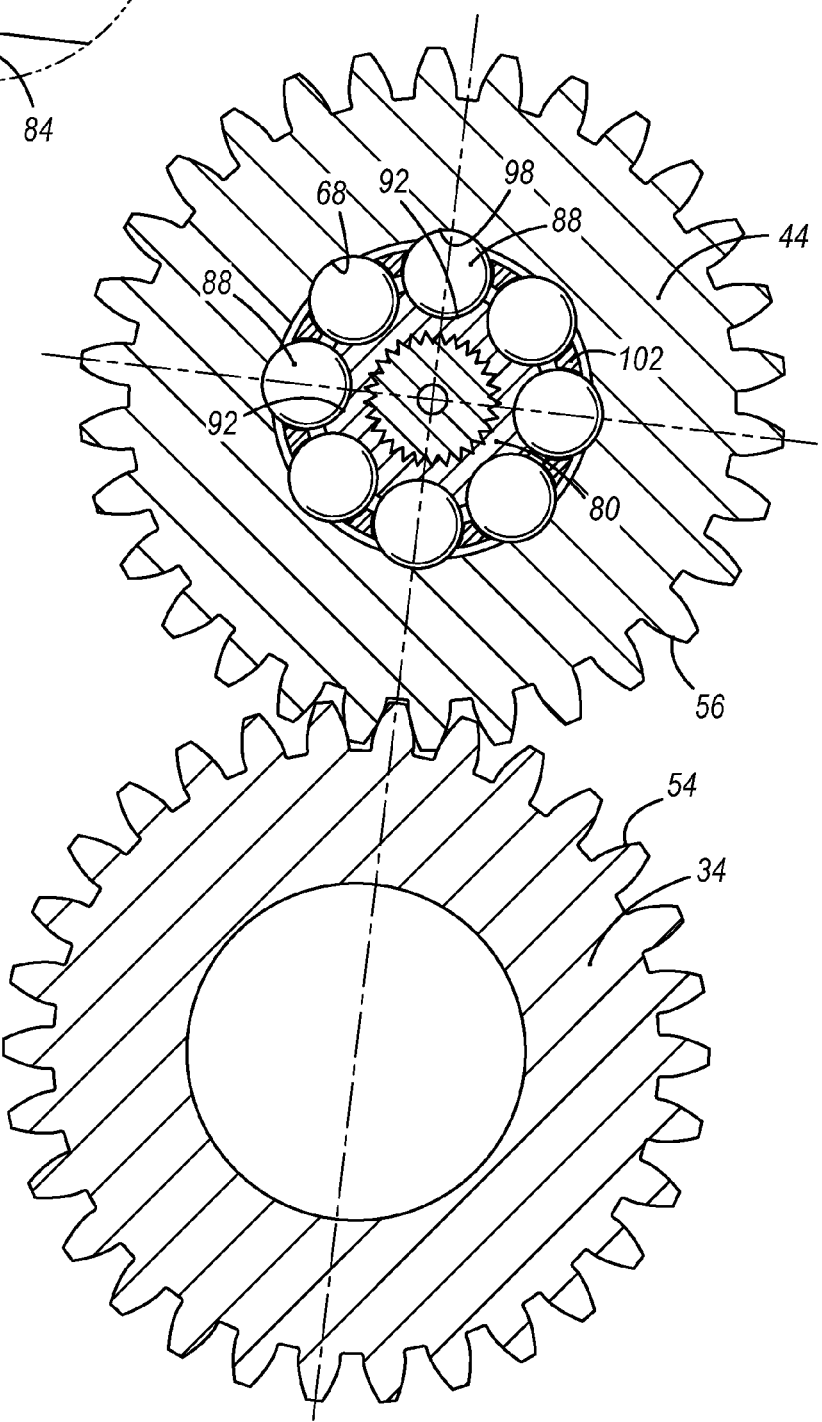
FIG. 3 is a cross section view taken in the direction of arrows 3-3 of FIG. 1.

A constant velocity joint mechanism is provided for connecting the propeller shaft 26 to the transmission/transfer unit 10. As seen in FIG. 1, the transmission/transfer unit 10 has a drive gear 34 journaled for rotation by roller bearing assemblies 36 and 38. A driven gear 44 is journaled for rotation within a housing 46 by roller bearing assemblies 48 and 50. The drive gear 34 has teeth 54 that mesh with teeth 56 of the driven gear 44, as seen in FIGS. 1 and 3. Accordingly, rotation of the drive gear 34 will cause the driven gear 44 to rotate.

As best seen in FIG. 1, the driven gear 44 includes a central portion 58 that carries the teeth 56, a forward hub portion 62 that is mounted on housing 46 by the roller bearing assembly 48, and a rear hub portion 64 that is mounted on housing 46 by the roller bearing assembly 50. The driven gear 44 has a central bore 68 that extends axially through the center of the driven gear 44 including its central portion 58, forward hub portion 62, and rear hub portion 64. The central bore 68 has an axis 70, at the center of rotation of the driven gear.

Figure 2:
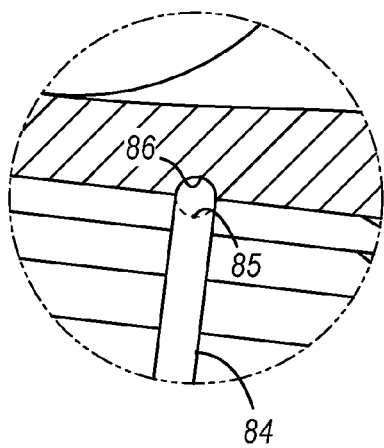
FIG. 2 is an enlargement of the area designated 2 in FIG. 1.

A yoke 72 is attached to the prop shaft 26 and extends inside the central bore 68 of the driven gear 44. In particular, as seen in FIG. 1, the yoke 72 has a hub end 74 that extends into the end of the prop shaft 26 and is welded thereto at welds 75. Opposite the hub end 74, the yoke has a shaft end 76 with splines 78 formed thereon. An inner race 80, of annular shape, encircles the shaft end 76 of the yoke 72 and has splines 82 that mesh with the splines 78 of the yoke 72. Thus, the meshing of the splines 78 and 82 permit the inner race 80 to slide onto the yoke 72. A split retaining ring 84, best seen in FIG. 2, seats within recesses 85 and 86 provided respectively on the yoke 72 and the inner race 80 to retain the inner race 80 at a certain location on the shaft 72, while the splines 78 and 82 lock the inner race 80 to the yoke 72 for rotation therewith.

As seen in FIGS. 1 and 3, a plurality of balls 88 are positioned between the inner race 80 and the driven gear 44. In particular, as best seen in FIG. 3, the inner race 80 has curved grooves 92 that extend axially on its outer surface 94 to seat and capture each of the balls 88. Also, the central bore 68 of the driven gear 44 has longitudinal extending grooves 98 that extend axially within the driven gear 44 to seat and capture the corresponding ball 88. These grooves 98 of the driven gear 44 are rectilinear, that is the grooves 98 are the same distance from the axis of the central bore 68 all along the length of the groups 98. In addition, the balls 88 are captured and precisely spaced relative one another by a cage 102 of annular shape that has openings 104 therein for receiving the balls 88.

During assembly of the joint, the yoke 72, with the inner race 80 retained thereon by the retaining ring 84, and with the balls 88 held in position by the cage 102, will be slid into the central bore 68 of the driven gear 44. Then an end cap 108 of stamped metal construction is pressed into place to seal the end of the central bore 68. A rolling diaphragm seal 110 is provided between the yoke 72 front hub 62 of the driven gear 44. The seal 110 has an inner portion 112 attached to the forward hub 62 by a retaining cap 114, and an outer portion 115 attached to the yoke 72 by a clamp 116.

In operation, the rotation of the drive gear 44 by the transmission/transfer unit will rotate the driven gear 44 because the teeth 54 and 56 are meshing with one another. Rotation of the driven gear 44 will rotate the balls 88 because the balls 88 are captured within the grooves 98 of the driven gear 44.

Rotation of the balls 88 will rotate the inner race 80 because the balls are captured within the curved grooves 92 of the inner race 80. Rotation of the inner race 80 will rotate the yoke 72 and provide power to the front differential 28 because the splines 78 and 82 lock the inner race 80 to the yoke 72.

The transmission/transfer unit 10 is mounted on the vehicle body by compliant rubber mounts and will roll and vibrate somewhat relative the body during operation of the vehicle, particularly when the engine and the transmission/transfer unit are subject to torque. Although the front differential is fixedly mounted on the vehicle body, nonetheless the vehicle body itself is subject to some flexure due to highway conditions. As a result, the yoke 72 will be caused to plunge left and right somewhat viewed in FIG. 1. This plunging of the yoke 72 will be permitted by the balls 88 sliding axially of the driven gear 44 within the grooves 98. In addition, the motion and flexure may cause some swiveling movement or angulation of the yoke 72 within the driven gear 44. This swiveling movement or angulation of the yoke 72 is accommodated by the ability of the balls 88 to travel in the grooves 98 and the fact that the curved shape of the curved grooves 92 will maintain a constant force on the balls 88 so that slack cannot develop between the balls 88, driven gear 44, and the inner race 80.

Thus it is seen that the invention provides a new and improved constant velocity joint for connecting a vehicle transmission/transfer unit to a propeller shaft transmitting power to a front differential. It will be understood that the foregoing that the foregoing drawings and description are exemplary of the invention and variations may be made. For example, although eight balls are shown in the drawing, any number of balls can be employed.

What is claimed is:

1. A drive arrangement for connecting a drive gear of a vehicle transmission/transfer to a prop shaft that drives a set of wheels, the combination comprising:
    a driven gear journaled for rotation on a housing and having teeth meshing with teeth provided on the drive gear, said driven gear having an axially extending cylindrical central bore;
    a yoke attached to the prop shaft and having a shaft extending into the central bore of the driven gear;
    an annular inner race having a central bore encircling the yoke and an outer surface;
    matching splines provided on the inner race and the yoke so that the inner race and the yoke are coupled for rotation;
    and a plurality of balls located between the outer surface of the inner race and the central bore of the driven gear, each of the balls being seated within longitudinally extending first grooves provided on the outer surface of the inner race and longitudinally extending second grooves provided on the central bore of the driven gear, said balls transmitting rotary torque between the driven gear and the inner race and said balls also rolling axially within the first and second grooves to permit movement of the yoke within the central bore during high speed rotation of the driven gear and prop shaft.

2. The drive arrangement of claim 1 further comprising said splines mounting the inner race for axial sliding movement on the yoke and a retaining ring acting between the yoke and the inner race to retain the inner race against axial sliding on the yoke.

3. The drive arrangement of claim 1 further comprising said first grooves provided on the outer surface of the inner race being curved.

4. The drive arrangement of claim 1 further comprising said second grooves provided on the central bore of the driven gear being rectilinear without curvature.

5. The drive arrangement of claim 1 further comprising the driven gear having an open end and an end cap closing the open end.

6. The drive arrangement of claim 1 further comprising a seal acting between the yoke and the driven gear.

7. The drive arrangement of claim 6 further comprising the seal being a rolling diaphragm seal and having an outer portion mounted on the driven gear and an inner portion mounted on the yoke.

8. A drive arrangement for connecting a drive gear of a vehicle transmission/transfer to a prop shaft that drives a set of wheels, the combination comprising:
    a driven gear journaled for rotation on a housing and having teeth meshing with teeth provided on the drive gear, said driven gear having an axially extending cylindrical central bore and a plurality of axially extending rectilinear grooves;
    a yoke attached to the prop shaft and having a shaft extending into the central bore of the driven gear;
    an annular inner race having a central bore encircling the yoke and an outer surface, said outer surface having a plurality of curved grooves that extend axially;
    matching splines provided on the inner race and the yoke so that the inner race and the yoke are coupled for rotation and the inner race can slide axially on the yoke;
    a retaining ring acting between the yoke and the inner race to retain the inner race against axial sliding on the yoke;
    and a plurality of balls located between the outer surface of the inner race and the central bore of the driven gear, each of the balls being seated within a curved groove of the inner race and rectilinear groove of the driven gear so that the plurality of balls transmit rotary torque between the driven gear and the inner race and said balls also roll axially within the first and second grooves to permit movement of the yoke within the central bore during high speed rotation of the driven gear and prop shaft.

9. The drive arrangement of claim 8 further comprising the driven gear having an open end and an end cap closing the open end.

10. The drive arrangement of claim 8 further comprising a seal acting between the yoke and the driven gear.

11. The drive arrangement of claim 10 further comprising the seal being a rolling diaphragm seal and having an outer portion mounted on the driven gear and an inner portion mounted on the yoke.

12. A drive arrangement for connecting a drive gear of a vehicle transmission/transfer to a prop shaft that drives a set of wheels, the combination comprising:
    a driven gear journaled for rotation on a housing and having teeth meshing with teeth provided on the drive gear, said driven gear having an axially extending cylindrical central bore and a plurality of axially extending rectilinear grooves within the central bore;
    a yoke attached to the prop shaft and having a shaft extending into the central bore of the driven gear;
    an annular inner race having a central bore encircling the yoke and an outer surface, said outer surface having a plurality of curved grooves that extend axially;
    matching splines provided on the inner race and the yoke so that the inner race and the yoke are coupled for rotation and the inner race can slide axially on the yoke;
    a retaining ring acting between the yoke and the inner race to retain the inner race against axial sliding on the yoke;

and a plurality of balls located between the outer surface of the inner race and the central bore of the driven gear, each of the balls being seated within a curved groove of the inner race and rectilinear groove of the driven gear so that the plurality of balls transmit rotary torque between the driven gear and the inner race and said balls also roll axially within the first and second grooves to permit movement of the yoke within the central bore during high speed rotation of the driven gear and prop shaft;

an end cap closing one end of the central bore of the driven gear;

and a rolling diaphragm seal sealing the other end of the central bore, said seal having an outer portion mounted on the driven gear and an inner portion mounted on the yoke.

\* \* \* \* \*